US008676242B2

(12) United States Patent
Zhang

(10) Patent No.: US 8,676,242 B2
(45) Date of Patent: Mar. 18, 2014

(54) METHOD AND APPARATUS FOR REGISTRATION OF LOCATION INFORMATION OF WIRELESS DEVICES IN A WIRELESS COMMUNICATION NETWORK SUPPORTING MULTICAST CALLS

(75) Inventor: Xinping Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1183 days.

(21) Appl. No.: 11/676,186

(22) Filed: Feb. 16, 2007

(65) Prior Publication Data

US 2008/0200198 A1  Aug. 21, 2008

(51) Int. Cl.
*H04B 7/00* (2006.01)
(52) U.S. Cl.
USPC .......................................................... 455/518
(58) Field of Classification Search
USPC .......................................................... 455/518
See application file for complete search history.

(56) References Cited

U.S. PATENT DOCUMENTS

| | | | |
|---|---|---|---|
| 7,260,396 B2 | 8/2007 | Balachandran et al. | |
| 7,633,914 B2 | 12/2009 | Shaffer et al. | |
| 2005/0054349 A1* | 3/2005 | Balachandran et al. | 455/456.1 |
| 2005/0124293 A1* | 6/2005 | Alicherry et al. | 455/41.2 |
| 2005/0186970 A1* | 8/2005 | Yates et al. | 455/456.5 |
| 2006/0221968 A1* | 10/2006 | Razdan et al. | 370/392 |
| 2007/0037596 A1 | 2/2007 | Shaffer et al. | |
| 2007/0155416 A1* | 7/2007 | Donnellan | 455/518 |
| 2008/0070584 A1* | 3/2008 | Kuo | 455/452.1 |
| 2008/0119172 A1* | 5/2008 | Rao et al. | 455/414.1 |

FOREIGN PATENT DOCUMENTS

| | | |
|---|---|---|
| WO | 03030453 | 4/2003 |
| WO | 2008064149 | 5/2008 |

OTHER PUBLICATIONS

International Search Report—PCT/US08/054159—International Search Authority—European Patent Office—Jun. 25, 2008.
Written Opinion—PCT/US08/054159—International Search Authority—European Patent Office—Jun. 25, 2008.

* cited by examiner

*Primary Examiner* — Yuwen Pan
*Assistant Examiner* — Ankur Jain
(74) *Attorney, Agent, or Firm* — Robert J. O'Connell; Raphael Freiwirth

(57) ABSTRACT

An apparatus and method for transmitting push-to-talk (PTT) communications through multicast channels to a plurality of wireless devices. The PTT server uses the unicast approach to deliver the PTT communication to a group of PTT clients when it does not have the location information of the PTT clients in the group. In one embodiment, the wireless devices report their location to a PTT server after receiving a PTT communication for a group and a timer is started. The wireless devices continue to report their location when moving from an area served by one base station to an area served by another before the timer expires. The PTT server also starts the timer for that PTT group with the same value after initiating the PTT group communication. The PTT server uses the location information to determine if multicast channels can be used when transmitting PTT communications to the wireless devices.

19 Claims, 6 Drawing Sheets

METHOD AND APPARATUS FOR REGISTRATION OF LOCATION INFORMATION OF WIRELESS DEVICES IN A WIRELESS COMMUNICATION NETWORK SUPPORTING MULTICAST CALLS

BACKGROUND OF THE INVENTION

1. Field of the Invention

The invention relates to communication in a wireless telecommunication system, and more particularly, to the registration of location information of individual wireless communication devices of a designated group in a wireless telecommunication system.

2. Description of the Related Art

In wireless telecommunication systems, Push-to-talk (PTT) capabilities are becoming popular with service sectors. PTT can support a "dispatch" voice service that operates over standard commercial wireless infrastructures, such as code division multiple access (CDMA), frequency division multiple access (FDMA), time division multiple access (TDMA), and global system for mobile communications (GSM). In a dispatch model, communication between endpoints ("end user devices") occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification. A PTT group call generally comprises a PTT call with 3 or more group members. In the absence of a wireless multicast channel, each group is formed by the combination of separate point-to-point connections between each endpoint and PTT server. Each endpoint is also known as a client. Alternatively, when a group is reduced to two members and a PTT call is from one member to another, the PTT call would be a direct call between these two members.

FIG. 1 illustrates a prior art architecture 100 supporting PTT communications. The architecture includes the deployment of a single PTT server 112 region in conjunction with a carrier's CDMA infrastructure and packet data network. Each region of the PTT server 112 is deployed over a specific portion of a carrier packet data network. The PTT server 112 within the region may be routing traffic between one or more Packet Data Service Nodes (PDSNs) in the carrier network. A communication device 102 that supports the PTT feature is in communication with a base station (BS) 104. Each BS 104 may be in communication with one or more base station transceivers (BTS) 114. The base station 104 is in communication with a high speed network 106 and PTT communications received from the communication device 102 is sent through the base station 104 and the network 106 to a packet data service node (PDSN). The PDSN communicates with the high speed network 106 and a PTT server 112's network 108, which is connected to a PTT network 110. The PDSN forwards the PTT communications to a PTT server 112 in the PTT network 110.

The PTT server 112 handles PTT communications among members of a PTT group. The PTT server 112 receives a PTT communication from one member and forwards it to all members of the PTT group. The PTT communication is usually received as data packets from the network 110, and the PTT communication sent out by the PTT server 112 is also in data packet format. A packet data service node (PDSN) and a connected base station (BS) then established through a BTS 114 a dedicated traffic channel to transmit the PTT communication to a receiving mobile client (a PTT member).

FIG. 2 illustrates a prior art communication tower 202 connected to a BS 104 and transmitting radio signals in its coverage area where several wireless devices 102 are located. The BS 104 transmits a PTT call destined for two wireless devices 102. When a user initiates a PTT call destined to members of a PTT group, the PTT server 112 determines the location of each member and forwards the PTT call to each member. When two receiving members of a PTT call are served by a single BS 104, the BS 104 establishes one communication channel to each wireless device. If there is another incoming PTT communication to members of another PTT group in the same cell, the BS 104 needs to allocate resources and establishes additional traffic channels to each of other receiving PTT members.

Allocating resources for each PTT communication and establishing a traffic channel to support each PTT communication are important part of the PTT communication system. It is desirous to have a PTT communication system that can easily and efficiently manage the resources to support multiple PTT calls utilizing the specific location information of the various group devices.

SUMMARY OF THE INVENTION

The apparatus and method described herein enables efficient usage of multicast channels for broadcasting of PTT communication to a plurality of wireless devices. In one embodiment, there is provided a method for registering location information of a wireless communication device. The method includes receiving from the base station a push-to-talk (PTT) communication and, if the PTT communication received is for a group call, transmitting a location information to a PTT server.

In another embodiment, there is provided a method for transmitting PTT communications to a plurality of wireless devices through a multicast channel. The method includes receiving a PTT communication destined for a plurality of wireless devices, identifying location information for each of the plurality of wireless devices, checking if the location information is valid, if the location information is valid, checking if multicast communication can be used, and if the multicast communication can be used, sending the PTT communication through a multicast channel to the plurality of wireless devices.

In yet another embodiment, there is provided an apparatus for transmitting push-to-talk (PTT) communications on to a plurality of wireless devices through a multicast channel over a wireless communication network. The apparatus includes a network interface unit for receiving a PTT communication destined to a plurality of wireless devices and sending the PTT communication to the plurality of wireless devices, a storage unit for storing location information for each of the plurality of wireless devices, and a controller unit for analyzing the location information and determining whether multicast channels can be used to transmit the PTT communication to the plurality of wireless devices.

Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "wireless communications device," "PTT communication device," "handheld device," "mobile device," "mobile client", "end-user device" and "handset" are used interchangeably. The terms "call" and "communication" are also used interchangeably, as are the terms "base station" and "base station server." The term "application" as used herein is intended to encompass executable and nonexecutable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

In overview, the system and method enables wireless devices of a PTT group of preferably three or more members to efficiently communicate their locations to a PTT server 112. It should be noted that the system can be implemented from an initial direct call between two members of a PTT group, where additional members are then added to the group. However, in an implementation as presented, a group call will be used to mean an initial PTT call with 3 or more users.

When a PTT communication is sent to a group of wireless devices distributed throughout a geographical region, generally one communication channel is established from a BS 104 to each wireless device. The communication channel is a unicast channel since it is from the BS 104 to one wireless device. When multiple wireless devices are located in the same geographical region served by the same BS, the BS 104 can broadcast the PTT communication through a multicast call. The multicast call is supported by Broadcast Multicast Services (BCMCS). The BCMCS allows optimized use of a broadband wireless network for delivery of BCMCS content streams to one or more terminals in one or more regions of an operator's network. The multicast call is then transmitted over a multicast channel. The multicast channel is commonly used when there is more than one recipient in a particular geographical area. So, instead of establishing multiple unicast calls, one to each recipient, a multicast call is established.

Figure 1:
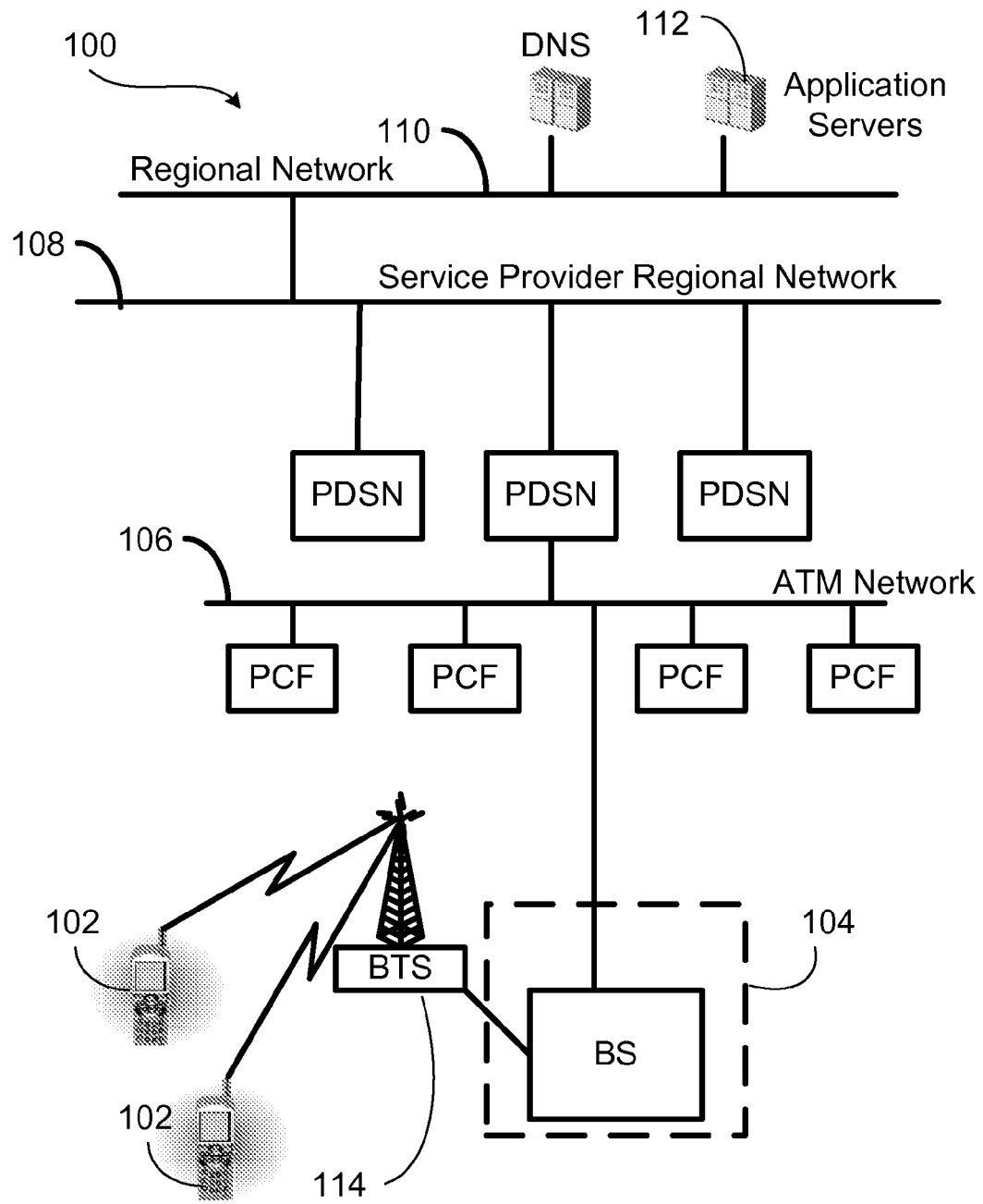
FIG. 1 is a prior art architecture of a wireless communication network.
Figure 2:
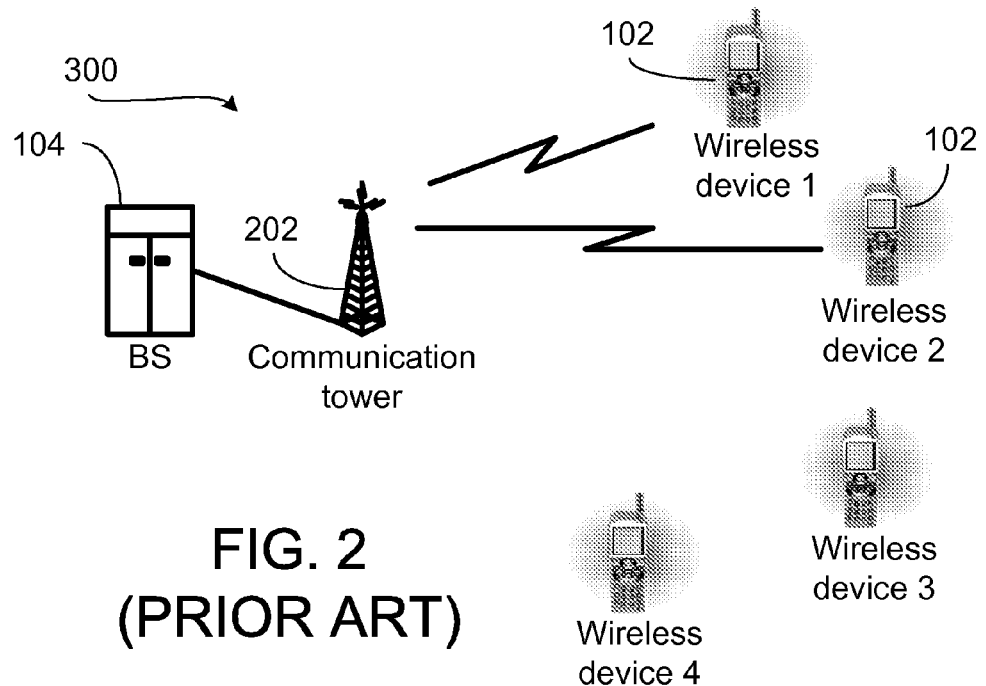
FIG. 2 a prior art base station supporting a PTT communication to multiple wireless communication devices.
Figure 3:
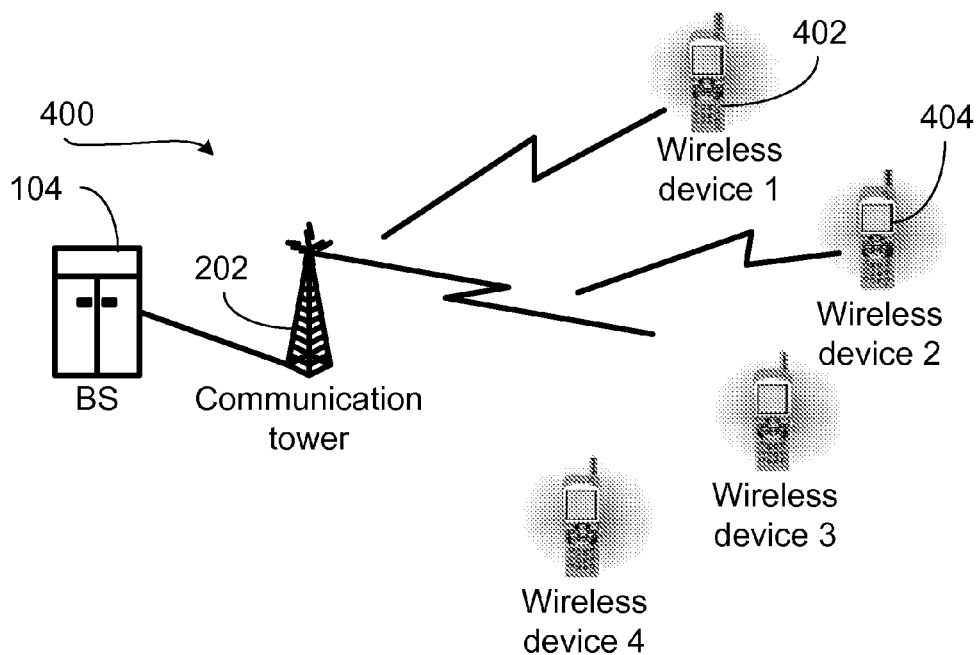
FIG. 3 illustrates a base station supporting a multicast PTT communication to multiple wireless communication devices.
Figure 4:
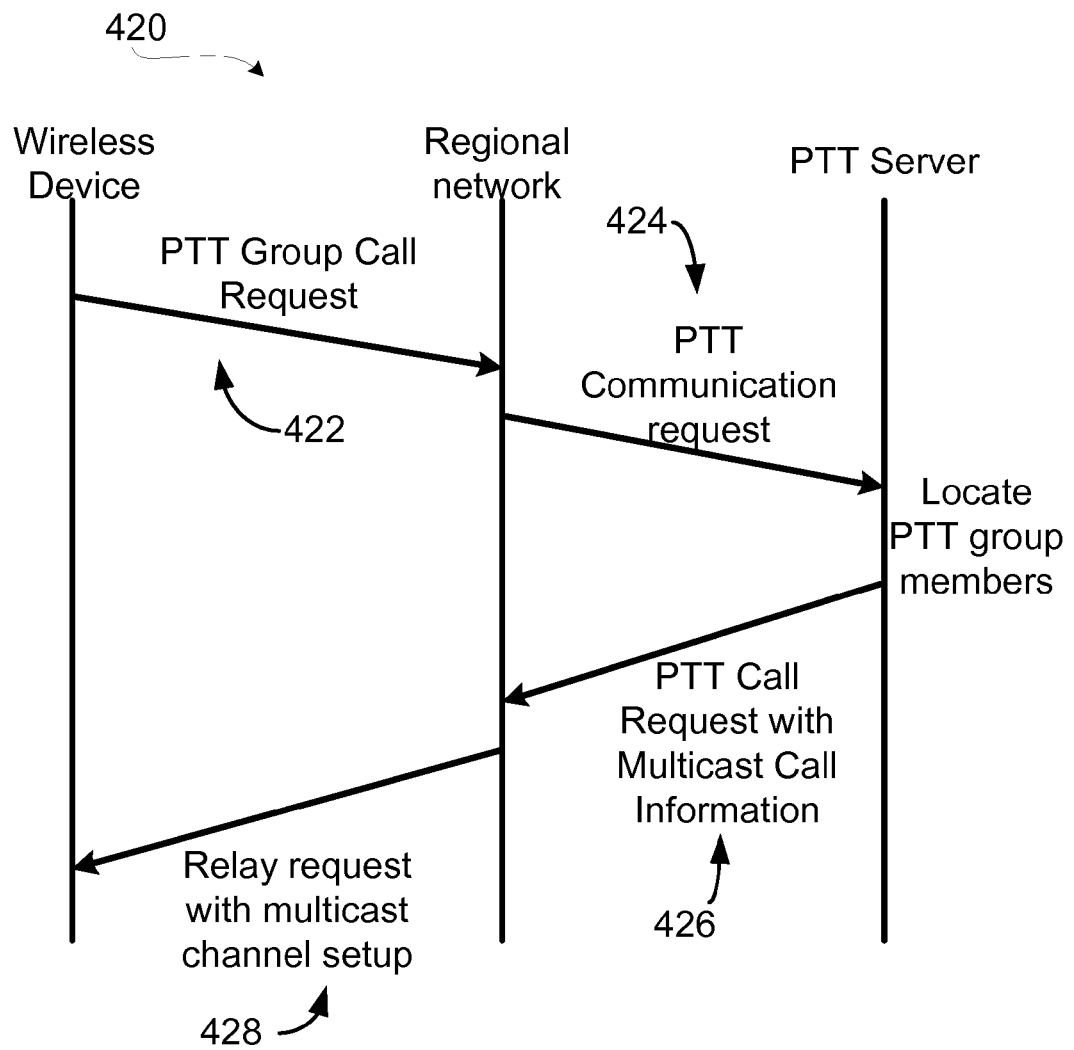
FIG. 4 illustrates information exchange during a PTT process.

FIG. 3 illustrates a BS 104 supporting a multicast communication to two wireless devices, 402, 404. The efficiency usage of multicast communication is enhanced when the multicast communication is used to support a large number of wireless devices; however, for simplicity of the description, the example described by FIG. 3 is limited to two wireless devices 402, 404. As illustrated in the process 420 in FIG. 4, at 422 a member of a PTT group uses his wireless device to make a PTT call to other members of his PTT group. At 424, the regional network relays the communication to the PTT server 112. The PTT server 112 receives the PTT communication and determines that two members are located in the same geographical area and served by the same BS 104. The PTT server 112 determines that it is possible to use a multicast call to transmit the PTT call to those two recipients. At 426, the PTT server 112 first sends a call request to the targeted wireless devices via BS 104. The call request contains information about the multicast channel to be used for this group call. At 428, the targeted wireless devices obtain the details about the multicast channel using information received from the call request message and also from the BS 104 overhead messages. The targeted wireless devices then start to monitor the broadcast channel. After the PTT call setup signals are exchanged, the originator starts to send speech to the PTT server 112, and the PTT server 112 sends the speech with multicast traffic to the BS 104. The BS 104 sends out the speech over a multicast channel.

To efficiently use the multicast communication, the PTT server 112 generally needs to know the location of each wireless devices of a PTT group. However, tracking the position of wireless devices constantly may significantly increase the network traffic. By tracking the position of wireless devices only when the PTT communications are likely to occur, the network traffic can be reduced. The PTT communications usually occur in a "burst mode," i.e., after a first PTT communication is generated from a user, it is likely that it will be followed by PTT communications from other users. This burst of PTT communications may last a few minutes, and then may be followed by a relatively long period of silence until a next burst. A typical scenario of this burst mode of PTT communications is as follows. A foreman picks up his wireless device and sends a PTT communication to his crew to inquire about the progress of a roof construction. After receiving this inquiry on a wireless device, a member of his crew responds through another PTT communication that the job is progressing but there may not be enough shingles. The foreman, upon learning of this possible shortage of shingles, responds by telling his crew that he will go the nearest building supply store to pick up additional shingles; the crew responds by acknowledging the receipt of the message. The acknowledgment is followed by silence that may last a half hour until the foreman arrives at the building supply store. After arriving at the building supply store, the foreman calls his crew through a PTT communication and inquires about the quantity of shingles needed to finish the roofing job. His crew responds through another PTT communication with the quantity needed, and the foreman acknowledges it. In this example, there are two bursts of PTT communications separated by a period of silence.

One way to track the positions of wireless devices without substantially increasing the network traffic is to track the positions after the first PTT communication. When the PTT server 112 receives the first PTT communication from a user, it is likely that the location information for each wireless device is old and no longer valid. Therefore, the PTT server 112 sends the PTT communication to each receiving PTT member through a unicast call, i.e., the traditional way of establishing a communication from a BS 104 to each wireless device. Since, it is likely for the PTT server 112 to receive follow up PTT communications for the same PTT group, it would be beneficial for the PTT server 112 to track the position of each wireless device for a certain time period.

Figure 5:
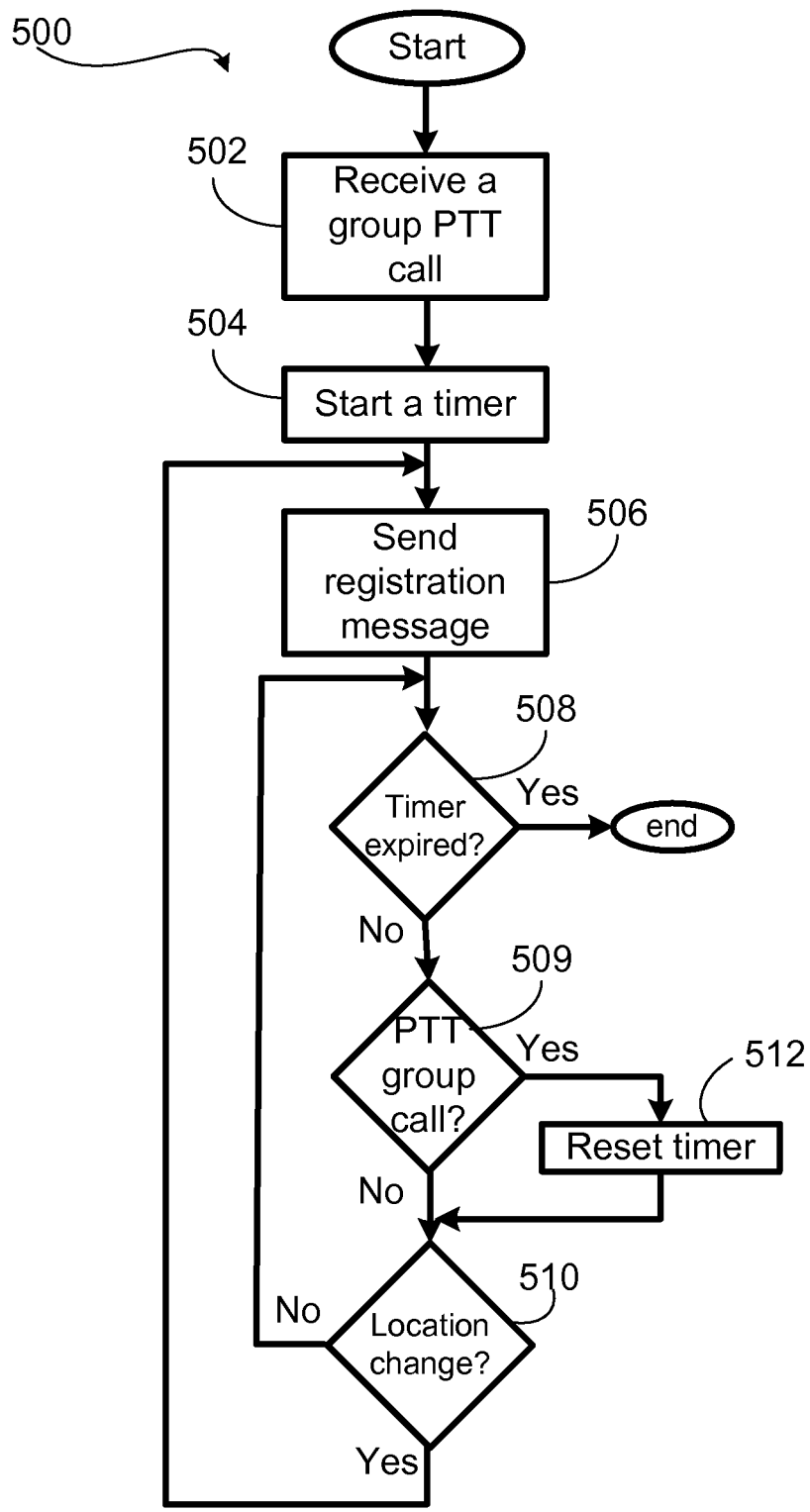
FIG. 5 is a flow chart for one embodiment of a wireless device process.

FIG. 5 illustrates a process 500 in which a wireless device monitors and reports location information. In block 502, a wireless device receives a first PTT communication as a group call from a BS 104. Generally a PTT server 112 sends a call request to the targed wireless device via a BS 104. Proceeding to block 504, the wireless device starts a timer. The timer may be of any type of device which may be used to track time duration. Alternatively, a time stamp or similar type of time tracking method may be used. Proceeding to block 506, the wireless device sends a message to the PTT server 112 with its location information. The message can be a registration message or any other message capable of transmitting the location information. The wireless device constantly monitors broadcast messages from the BS 104 and the broadcast message includes the identification of the BS 104. The identification of the BS 104 received from the broadcast messages is generally stored. When the user moves from one area covered by one BS 104 to another area covered by another BS 104, the wireless device learns about the location change when the identification of the BS 104 retrieved from a newly arrived broadcast message differs from the identification of the stored BS 104. This identification of the BS 104 may be sent to the PTT server 112 and used by the PTT server 112 as the location information. Alternatively, the broadcast message sent from the BS 104 may also include a multicast region identification, which can be used by a wireless device to identify its current location. Any other identification information that the wireless receives, such as GPS, may be used to identify its current location.

At block 508, the timer is checked to determine if it has expired. The timer may be used as a measure that the location information has become obsolete. The actual timer value is generally configurable and may vary depending upon the environment of the wireless communication network. If the timer has expired, the location information is most likely not accurate any longer and process 500 proceeds along the YES branch to an END. In some configurations, after the timer expires, the wireless device stops monitoring the location information until the timer is reset by another incoming PTT communication. Therefore, a PTT group call will be received as a first PTT group call as stated above if the wireless device has not received a PTT group call for a predefined period. For example, if a PTT group call is received after the timer has expired, this PTT group call will be considered as the first PTT group call. If the timer has not expired, the process 500 proceeds along the NO branch to block 509. At block 509, the wireless device checks to see if a PTT group call has been received. If a PTT group call has been received, process 500 proceeds along the YES branch to block 512, where the timer will be reset each time a PTT group communication is received by the wireless device. In this way, the wireless device continues to inform the server about its location for a determined period after receipt of each PTT communication. However, other configurations may not reset the timer when a PTT group communication is received. In yet other configurations a value may be added to the timer value. Process 500 then proceeds to block 510.

Returning to block 509, if a PTT group call has not been received, process 500 proceeds along the NO branch to block 510. At block 510, the wireless device constantly monitors if its location has changed while the timer is running. If the wireless device's location has not changed, process 500 proceeds along the NO branch to block 508, where the timer is checked for expiration. If the location has changed, process 500 proceeds along the YES branch to block 506, where the wireless device sends a message with new location information to the PTT server 112. As indicated earlier, the location information may be contained within any type of message ordinarily sent to the PTT server 112. Other embodiments may use specific location messages sent to the PTT server 112.

Figure 6:
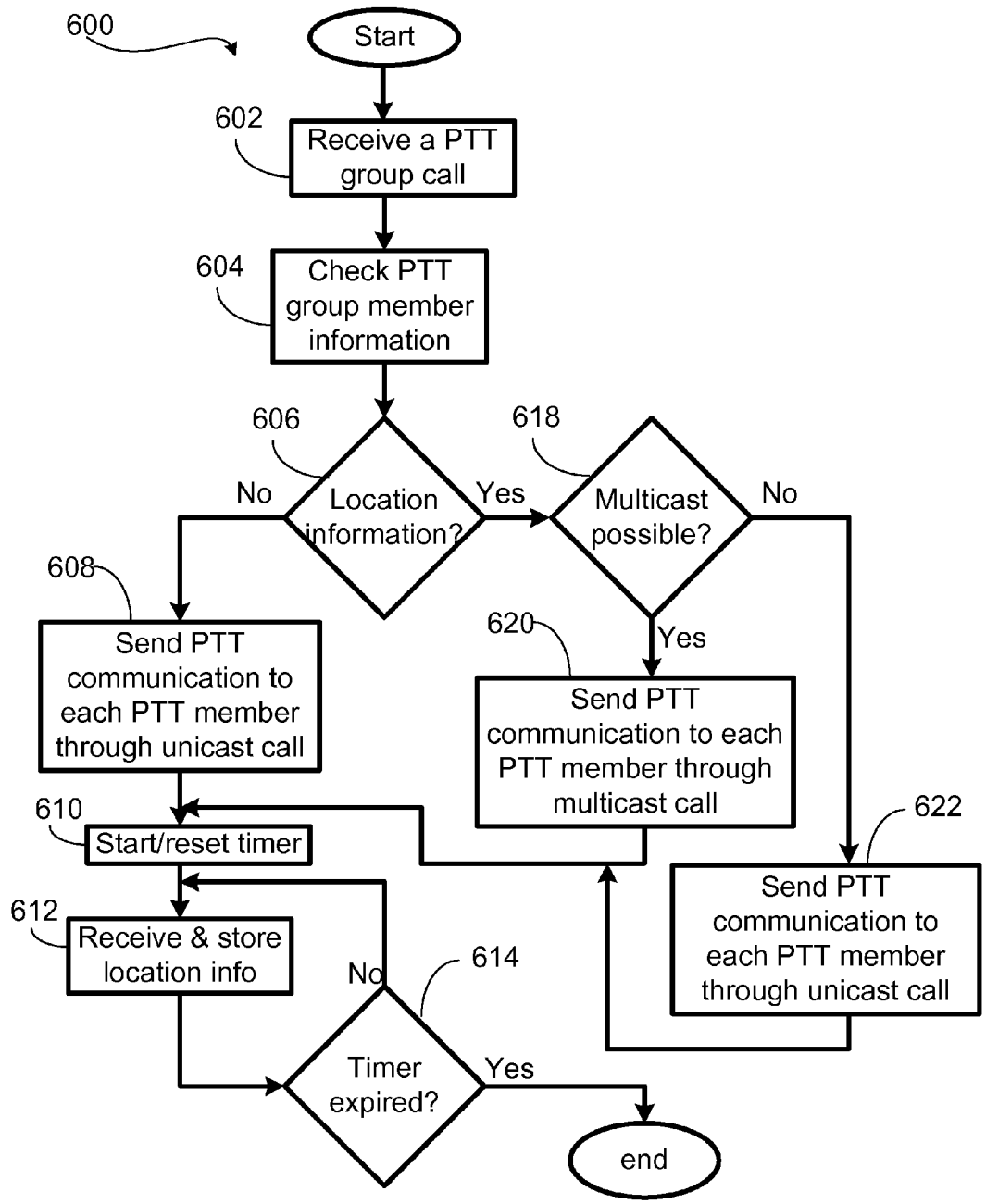
FIG. 6 is a flow chart for one embodiment of a PTT server process.

FIG. 6 illustrates a process 600 in which a server stores location information. In block 602, a member of a PTT group uses his wireless device to make a PTT call to other members of his PTT group. A PTT server 112 generally receives that PTT call from the user. At 604, the PTT server 112 identifies the PTT members associated with the call request and retrieves information on each PTT member. Identifying the PTT members may be done through a user database that may consist of a user name, a user ID and other information associated with a user. Other configurations may use other well known standards in the art to identify members. In one configuration, the PTT member information includes location information. In block 606, the PTT server 112 checks if valid location information is available. If the location information is not available or expired, i.e., old location information may be disregarded, the process 600 proceeds along the NO branch to block 608. In block 608, the PTT server 112 sends the PTT communication as a group call to each PTT member through unicast channels. The group call to each PTT member may be any message which provides the functionality to alert a PTT member that a PTT call is being requested. Proceeding to block 610, the PTT server 112 starts a timer. In some configurations, if the timer is running already, then it will be reset. Proceeding to block 612, the PTT server 112 receives and stores the location information sent by each wireless device. Any method known to send and receive location information may be used. At block 614, the location information becomes obsolete when the timer expires and the process 600 proceeds along the YES branch to the END. In other configurations, the timer may be reset each time the PTT server sends a PTT communication to the wireless devices. Therefore the process 600 proceeds along the NO branch to block 612, where the PTT server will continue to receive location information from the wireless devices for a determined period after sending a PTT communication. Alternatively, the PTT server 112 may, instead of starting a timer, associate a time stamp with each location information. The PTT server 112 can use the time stamp to determine whether the location information is recent or obsolete. Other embodiments may use well-known data aging algorithms to determine whether the location information should no longer be used.

Returning to block 606, if the location information is available and valid, the process 600 proceeds along the YES branch to block 618. In block 618, PTT server 112 checks whether multicast calls can be employed. The multicast calls can be used if two or more wireless devices are located in the same geographical area and served by one single BS 104. If the multicast call can be used, process 600 proceeds along the YES branch to block 620, where the PTT server 112 sends the PTT communication to the PTT members through the multicast channel. Returning to block 618, if the multicast call cannot be used, the process 600 proceeds along the NO branch to block 622. In block 622, the PTT server 112 sends the PTT communication to the PTT members through unicast channels. In both instances, sending the PTT communication through the multicast channels, as shown in block 620 or unicast channels, as shown in block 622, the process 600 proceeds to block 610 and starts or resets the timer. By starting or resetting a timer, the location information will be updated with new location information received from the wireless devices. The new location information may affect how new PTT group calls are transmitted to the targeted wireless devices. It is noted that a combination of multicast and unicast calls may be used when the wireless devices are distributed in such way that some wireless devices are located in the same area while others are distributed in different areas. For example, wireless devices A, B, and C are located in the same area and served by the BS 1, and wireless devices D and E are located in different areas and served by the BSs 2 and 3 respectively. The PTT server will send the PTT communications to the BS 1 with instructions for a multicast call to wireless devices A, B, and C. The PTT server will also send the PTT communications to the BSs 2 and 3 with instructions for unicast calls to wireless devices D and E.

Figure 7:
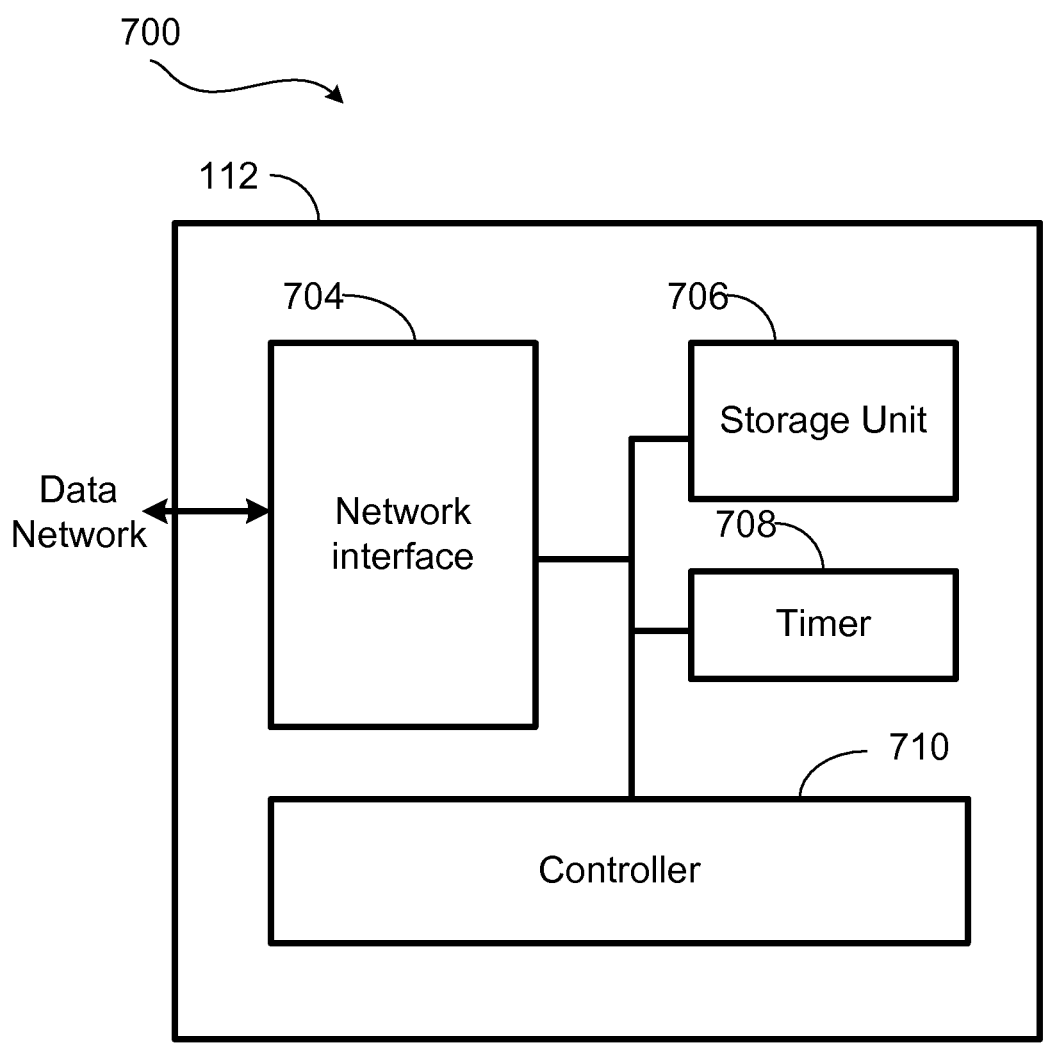
FIG. 7 is a block diagram for one embodiment of a PTT server supporting the present system.

FIG. 7 illustrates a simplified block diagram 700 of a PTT server 112. The PTT server 112 receives through a network interface 704 PTT communications from wireless devices. A controller 710 checks a PTT communication and determine its recipients. The controller 710 retrieves from a storage unit 706 information about each recipient of a PTT communication. By checking the location information for each recipient and some other factors, the controller 710 can determine if multicast calls can be used. If the multicast calls can be used, the controller 710 sends the PTT communication with instructions for a multicast call through the network interface 704 to a receiving base station 104. The PTT communication and the instructions are sent as a data packet through a network to the receiving base station 104, and then transmitted through a multicast channel from the base station 104 to the receiving wireless devices. The PTT server 112 may also include a timer 708 that helps to determine when to store the location information received from the wireless devices.

In one embodiment, when a user, John, wants to use his wireless device equipped with a PTT feature to communicate with his crew, John activates his wireless device. The wireless device sends a floor request to the PTT server 112. The PTT server 112 receives the request, verifies that no other user has the floor, and grants the floor to John. The grant message is received by John's wireless device and John can then speak into his wireless device. The wireless device transmits John's message to the PTT server 112. The PTT server 112 receives the PTT message from John, and identifies members of his PTT group. The PTT server 112 retrieves the location information for members of this PTT group and sees that the location information is no longer valid since it was last updated on the previous day. The PTT server 112 then sends the PTT message to base stations with an instruction for unicast calls.

After receiving the PTT message from the PTT server 112, the base station 104 transmits the PTT message as a group call through a communication channel established between the base station 104 and the targeted wireless device. The targeted wireless device receives the PTT message and verifies that it is sent through as a first group call, and then proceeds to start a timer and send its location information to the PTT server 112. The wireless device will continue to send its location information when the wireless device moves to a new location and the timer is still running. The messages with location information from all wireless devices are received by the PTT server 112. The PTT server 112 saves each location information with a time stamp.

After receiving the PTT message from John, Mary decides to follow up with another PTT message. So Mary sends a request for the floor to the PTT server 112, which verifies the availability and grants the floor to Mary. Mary speaks to the wireless device, which then sends the PTT message to the PTT server 112. The PTT server 112 retrieves the location information of each wireless device and sees the location information is recent and that David and Paul have the same location information. The PTT server 112 then sends the PTT message with instruction for a multicast call to the base station 104 serving David and Paul. The PTT server 112 also sends the PTT message with instruction for a unicast call to the base station 104 serving John.

While listening to the PTT messages, David drives his car to another location served by a base station 104 that is serving John. David's wireless device realizes that it is being served by a different base station 104 and sends a location registration message with new location information to the PTT server 112.

After listening to Mary's PTT message, Paul decided to follow up with his PTT message. Paul requests and receives the floor and speaks his PTT message to his wireless device. The PTT message device is again sent to the PTT server 112, which checks the location information of each targeted wireless device. Now, the PTT server 112 sees that David and John are served by the same base station, so the PTT server 112 sends the PTT message with instruction for multicast call to the base station 104 serving David and John. The PTT server 112 also sends the PTT message with instruction for unicast call to the base station serving Mary.

Although the invention is described above in a PTT environment, the invention is not limited to PTT communications. In a broader sense, the system and methods optimize bandwidth utilization by a base station supporting multiple multicast communications. In view of the method being executable on a wireless service provider's computer device, the method can be performed by a program resident in a computer readable medium, where the program directs a server or other computer device having a computer platform to perform the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 5-6, the method may be implemented, for example, by operating portion(s) of the wireless network, such as a wireless communications device or the server, to execute a sequence of machine-readable instructions. Though the process is illustrated in sequence, the method may be implemented in a different sequence or as an event driven process. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. For example, the description above is based on an audio PTT communication, it is understood the apparatus, system, and method can be easily modified to support other type of media, such as video, data, etc. Furthermore, although elements of the invention may be described or claimed in the singular, the plural is contemplated unless limitation to the singular is explicitly stated.

What is claimed is:

1. A method for transmitting PTT communications to wireless devices through a multicast channel, comprising:
   receiving a first PTT communication destined for a first wireless device;

determining that there is not valid location information for the first wireless device;

sending the first PTT communication to the first wireless device through a unicast channel;

in response to sending the first PTT communication to the first wireless device through the unicast channel, receiving location information for the first wireless device;

receiving a second PTT communication destined for the first wireless device and a second wireless device;

determining that the location information for the first wireless device is valid;

identifying that the first wireless device is capable of multicast communication through the multicast channel through which the second wireless device is also capable of multicast communication; and sending the second PTT communication through the multicast channel to the first wireless device and the second wireless device.

2. The method of claim 1, wherein determining that the location information for the first wireless device is valid comprises:

comparing a time stamp of the location information with a current time.

3. The method of claim 1, wherein the identifying comprises:

identifying that the first wireless device and the second wireless device have similar location information.

4. The method of claim 1, wherein the location information comprises an identification of a base station.

5. The method of claim 1, wherein the location information comprises an identification of a multicast region.

6. The method of claim 1, further comprising:

starting a timer; and wherein determining that the location information for the first wireless device is valid comprises: determining that the timer has not expired.

7. A system for transmitting push-to-talk (PTT) communications to wireless devices through a multicast channel over a wireless communication network, comprising:

a computer comprising a non-transitory storage medium bearing computer-readable instructions that, when executed on the computer, cause the computer to perform operations comprising:

receiving a first PTT communication destined for a first wireless device;

determining that there is not valid location information for the first wireless device;

sending the first PTT communication to the first wireless device through a unicast channel;

in response to sending the first PTT communication to the first wireless device through the unicast channel, receiving location information for the first wireless device;

receiving a second PTT communication destined for the first wireless device and a second wireless device;

determining that the location information for the first wireless device is valid;

identifying that the first wireless device is capable of multicast communication through the multicast channel through which the second wireless device is also capable of multicast communication; and sending the second PTT communication through the multicast channel to the first wireless device and the second wireless device.

8. The system of claim 7, wherein the non-transitory storage medium further bears instructions that when executed on the computer cause the computer to perform operations comprising:

starting a timer; and wherein determining that the location information for the first wireless device is valid comprises:

determining that the timer has not expired.

9. The system of claim 8, wherein the location information for the first wireless device comprises a time stamp.

10. An apparatus for transmitting push-to-talk (PTT) communications to wireless devices through a multicast channel over a wireless communication network, comprising:

means for receiving a first PTT communication destined for a first wireless device;

means for determining that there is not valid location information for the first wireless device;

means for sending the first PTT communication to the first wireless device through a unicast channel;

means for, in response to sending the first PTT communication to the first wireless device through the unicast channel, receiving location information for the first wireless device;

means for receiving a second PTT communication destined for the first wireless device and a second wireless device;

means for determining that the location information for the first wireless device is valid;

means for identifying that the first wireless device is capable of multicast communication through the multicast channel through which the second wireless device is also capable of multicast communication; and means for sending the second PTT communication through the multicast channel to the first wireless device and the second wireless device.

11. The apparatus of claim 10, further comprising:

means for starting a timer; and wherein the means for determining that the location information for the first wireless device is valid comprises: means for determining that the timer has not expired.

12. The apparatus of claim 10, wherein the means for determining that the location information for the first wireless device is valid comprises:

means for comparing a time stamp of the location information with a current time.

13. The apparatus of claim 10, wherein the means for identifying is configured to identify that the first wireless device and the second wireless device have similar location information.

14. The apparatus of claim 10, wherein the location information comprises an identification of a base station.

15. A non-transitory computer-readable medium comprising at least one instruction, which, when executed by a machine, causes the machine to perform operations, the instructions comprising:

a set of instructions to receive a first PTT communication destined for a first wireless device;

a set of instructions to determine that there is not valid location information for the first wireless device;

a set of instructions to send the first PTT communication to the first wireless device through a unicast channel;

a set of instructions to, in response to sending the first PTT communication to the first wireless device through the unicast channel, receive location information for the first wireless device;

a set of instructions to receive a second PTT communication destined for the first wireless device and a second wireless device;

a set of instructions to determine that the location information for the first wireless device is valid;

a set of instructions to identify that the first wireless device is capable of multicast communication through the multicast channel through which the second wireless device is also capable of multicast communication; and a set of instructions to send the second PTT communication through the multicast channel to the first wireless device and the second wireless device.

16. The non-transitory computer-readable medium of claim 15, wherein the set of instructions to determine that the location information for the first wireless device is valid comprises:

a set of instructions to compare a time stamp of each location information with a current time.

17. The non-transitory computer-readable medium of claim 15, further comprising:

a set of instructions to receive the location information from the first wireless device.

18. The non-transitory computer-readable medium of claim 15, wherein the location information is an identification of a base station.

19. The non-transitory computer-readable medium of claim 15, further comprising:

a set of instructions to start a timer; and
wherein the set of instructions to determine that the location information for the first wireless device is valid comprises: a set of instructions to determine that the timer has not expired.

* * * * *